Patented Dec. 13, 1927.

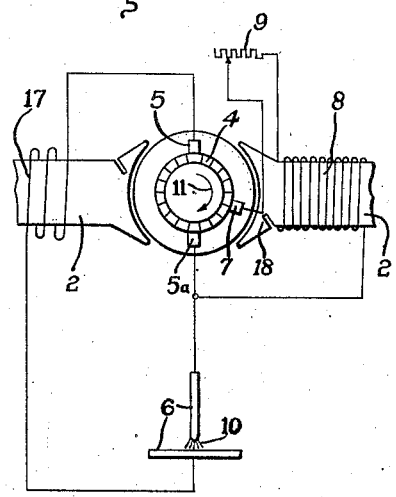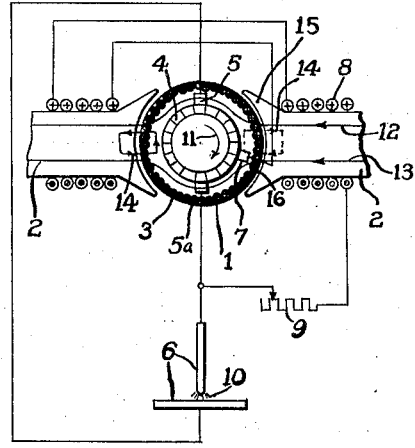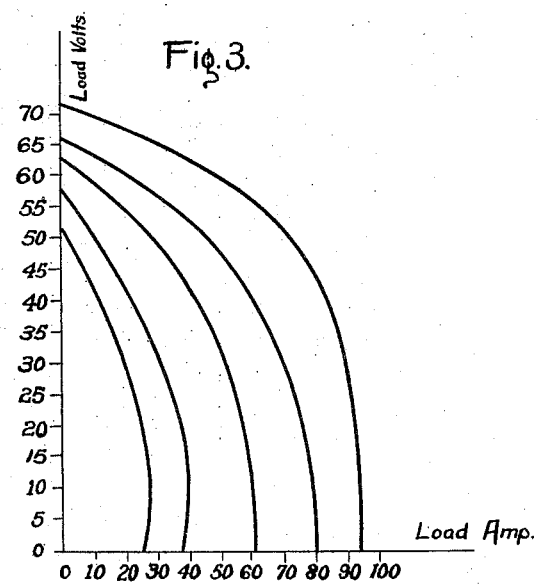

1,652,526

UNITED STATES PATENT OFFICE.

SCOTT HANCOCK, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING GENERATOR.

Application filed May 24, 1923. Serial No. 641,058.

My invention relates to dynamo-electric machines and it has particular relation to direct-current generators which are adapted for use in connection with arc welding systems or loads of a similar nature.

The requirements of a welding generator are well known. The no-load voltage of the generator should be approximately 60 to 80 volts. Upon striking the arc, the welding current should remain practically constant over a large range of voltages. The voltage of the arc varies to a certain extent with the arc length and is zero at the moment when the welding electrodes are short circuited. It is essential that, upon opening the short circuit, the voltage across the electrodes shall be quickly established in order that the arc may be stable. I term the latter requirement "the speed of action" of the generator and it is this characteristic which distinguishes successful arc-welding generators.

In order to obtain the "speed of action," it is essential that the current in the field winding, supplying the main generator field, shall not die down at the moment of the short circuit of the electrodes, thereby eliminating the time element required in order to build up the current in the exciting winding of the generator upon opening of the short circuit. To this end, in previously proposed generators of the above-mentioned type, the excitation of the generators has been derived either from an external independent source of voltage or by the provision of a double set of poles in one machine.

The object of my invention is to provide a self-excited direct current generator of a simple and economical construction having an inherent regulation, essential to a welding arc or another load of a similar character.

My invention will be best understood from the accompanying drawings, wherein Figs. 1 and 2 are diagrammatic views of two embodiments of my invention and Fig. 3 is an explanatory curve diagram referred to hereinafter.

In Fig. 1 is shown an armature 1 co-operating with two pole pieces 2. The armature is provided with a winding 3 and a commutator 4. Main brushes 5 and $5^a$ co-operate with the commutator 3 and are connected to electrodes 6 constituting the terminals of an arc 10 drawn between the electrodes. An auxiliary brush 7 is arranged between the main brushes 5 and $5^a$ and is connected to one terminal of a field winding 8 mounted upon the pole pieces 2. The other terminal of the field winding 8 is connected, through a variable resistor 9, to one of the main brushes $5^a$. The direction of flow of the current in the armature winding 3 and in the field winding 8 is illustrated by means of dots and crosses, indicating respectively that the current is flowing toward and from the observer.

With the armature driven in the direction indicated by the arrow 11 and with no load connected to the brushes the magnetic flux through the machine will have a direction indicated by the lines 12 and 13. Upon connecting a load to the brushes the current flowing through the armature will set up a flux in the direction indicated by the arrows 14. The flux induced by the armature current will counteract the flux induced by the main winding 8 under the leading portions 15 of the pole pieces 2 and will act in the direction of the main flux under the trailing portions 16 of the pole pieces 2.

The pole pieces 2 are normally saturated and accordingly the augmenting effect of the armature reaction under the trailing portion 16 of the pole pieces will be inappreciable and this portion of the field will remain practically constant, independently of the armature reaction. On the other hand, the opposing effect of the armature reaction under the leading pole side 15 will decrease the flux density in this part of the poles and decrease thereby the total flux through the armature without an appreciable change in the flux density in the trailing portion 16 of the poles.

Under the above conditions the voltage induced between the main brushes 5 and $5^a$ will tend to decrease with an increase in the armature current, while maintaining practically unchanged voltage conditions in the portion of the winding connected between the auxiliary brush 7 and the main brush $5^a$. As the field winding 8 is connected to these brushes 7 and $5^a$, the exciting current is maintained substantially constant during all conditions of load. Such arrangement will have a similar effect as if the field winding 8 were excited from a separate external source.

When the arc is short circuited by momentarily touching the electrodes, the voltage across the main brushes momentarily falls to a very low value. However, the voltage between the main brush $5^a$ and the auxiliary brush 7 remains substantially constant, or else falls off but slightly, depending upon the saturation and leakage conditions of the machine and the position or setting of the auxiliary brush. Owing to the fact that the current in the exciting winding 8 does not fall with the voltage across the main brushes it will be clear that the flux throughout the entire pole face and adjacent armature conductors builds up very quickly in my machine, securing the hereinabove-described "speed of action" which is not obtained in machines wherein the exciting current must build up upon the removal of the electrode short circuit.

The welding current of the machine may be controlled by regulating the amount of the resistance 9 connected in the exciting circuit, or by shifting the auxiliary brush 7 or the main brushes 5 and 5ª.

In Fig. 2 is shown a generator similar to that illustrated in Fig. 1, but an additional series winding 17 is provided upon the pole pieces to amplify the action of the armature current in reducing the voltage across the terminals of the arc 6 with an increase in the welding current. The series winding 17 is connected in such direction as to give a magneto-motive force which opposes the magnetomotive force of the current in the main exciting winding 8.

In the generator illustrated in Fig. 2, the saturation in the trailing portion of the pole pieces 2 is increased through the provision of a notch 18 providing a path of narrow cross-section in one portion of each pole piece. This or another arrangement of the same character increases the effectiveness of the machine.

In operation, an increase in the load current increases rapidly the demagnetizing effect of the series field winding 17 so that a slight increase in the load current is accompanied by a very sharp decline in the load voltage. by reason, however, of the special construction of the pole members 2 which causes saturation of the trailing portion of the pole members with a relatively small total flux, the augmenting action of the armature currents is sufficient to maintain the flux in that part of the pole members substantially constant independently of the load current.

Fig. 3 shows the volt-ampere characteristics of a machine constructed according to Fig. 2. The curves are plotted for various welding currents, the different currents being obtained by a variation in the resistance connected in series with the main exciting winding 8.

In the foregoing description I have described my invention in connection with simplified wiring diagrams wherein I have omitted certain commonly utilized parts such as an auxiliary commutating pole winding and a reactor not necessary to an understanding of my improvements. While I have shown my improved welding generator as embodied in a bipolar machine, it is obvious that my invention may be incorporated in a multipolar machine. Various other modifications thereof will be evident to those skilled in the art and accordingly I do not wish to be limited to the exact arrangements herein shown and described but seek to cover, in the appended claims, all modifications which may come within the scope of my invention.

I claim as my invention:

1. A direct-current generator having a field structure comprising alternate north and south salient pole pieces so arranged that the trailing portions of the pole faces are saturated by reason of the flux distortion produced by armature reaction, whereas the remaining portions of the pole faces are not saturated, main positive and negative brushes disposed between pairs of pole pieces, an auxiliary brush disposed under one of the pole pieces adjacent the junction between the saturated trailing portion and the unsaturated remainder of the pole face, and a field winding energized from said auxiliary brush and the main brush adjacent to said saturated trailing portion.

2. A direct-current generator having a field structure comprising alternate north and south main salient pole pieces so arranged that the trailing portions of the pole faces are saturated by reason of the flux distortion produced by armature reaction, whereas the remaining portions of the pole faces are not saturated, main positive and negative brushes disposed between pairs of pole pieces, an auxiliary brush disposed under one of the pole pieces adjacent the junction between the saturated trailing portion and the unsaturated remainder of the pole face, a main work circuit energized from said main brushes, and means for exciting said salient pole pieces comprising a field winding energized from said auxiliary brush and the main brush adjacent to said saturated trailing portion, and a bucking series winding energized in accordance with the main load current.

In testimony whereof, I have hereunto subscribed my name this 14th day of May, 1923.

SCOTT HANCOCK.